United States Patent [19]
Rusu et al.

[11] Patent Number: 6,137,807
[45] Date of Patent: Oct. 24, 2000

[54] DUAL BANK QUEUE MEMORY AND QUEUE CONTROL SYSTEM

[75] Inventors: Marinica Rusu, Sunnyvale; Ihab A. Jaser, San Jose, both of Calif.

[73] Assignee: Whittaker Corporation, Simi Valley, Calif.

[21] Appl. No.: 08/985,609

[22] Filed: Dec. 5, 1997

[51] Int. Cl.[7] .................................................. H04L 12/54
[52] U.S. Cl. ........................ 370/429; 370/412; 370/422; 710/52
[58] Field of Search ................................... 370/389, 412, 370/413, 414, 415, 416, 417, 418, 428, 429, 422; 395/872, 874, 875, 876; 710/52, 53, 54, 55, 56, 57

[56] References Cited

U.S. PATENT DOCUMENTS

| | | | |
|---|---|---|---|
| 5,410,540 | 4/1995 | Aiki et al. ........................... | 370/390 |
| 5,513,174 | 4/1996 | Punj ................................... | 370/394 |
| 5,530,698 | 6/1996 | Kozaki et al. ..................... | 370/355 |
| 5,535,197 | 7/1996 | Cotton ............................... | 370/414 |
| 5,612,952 | 3/1997 | Motoyama ......................... | 370/412 |
| 5,815,501 | 9/1998 | Gaddis et al. ..................... | 370/402 |
| 5,825,767 | 10/1998 | Mizukoshi et al. ............... | 370/395 |
| 5,838,677 | 11/1998 | Kozaki et al. ..................... | 370/389 |

*Primary Examiner*—Ajit Patel
*Assistant Examiner*—Bob A. Phunkulh
*Attorney, Agent, or Firm*—Sitrick & Sitrick

[57] ABSTRACT

An input processor recognizes and accepts a wide variety of protocols and formats. Queue management stores the uniform cells in a dual balanced bank memory system, which provides for utilizing an available bank of memory when the other bank of memory is in use, and otherwise balancing the use of the banks of memory, thereby maintaining equal free lists. Queue management apparatus and logic also ascertains and appends routing data to the stored data and transmits the data according to its priority.

21 Claims, 8 Drawing Sheets

(Preferred embodiment of dual bank buffer queue)

Fig. 1A (Preferred embodiment of dual bank buffer queue)

DUAL BANK QUEUE MEMORY AND QUEUE CONTROL SYSTEM

BACKGROUND OF THE INVENTION

This invention relates to communication switches and data storage systems for use therewith, and more particularly, to a multiple queue bank balanced queue control system, architecture, and methodology.

Most current network switches utilize a single queuing memory control structure, where data in and out from one or more sources (e.g., Ethernet, ATM, etc.) and one or more output sources of the same or different types can be served by the single queue memory and control structure. One problem with the single queue memory and queue control system is that the queue system becomes a bottleneck, so that data flow can only be in to or out of the queue, that is the queue controller and queue memory provide for only unidirectional data transfer.

In accordance with the present invention, there is provided a balanced, shared multiple bank queue memory architecture with a queue control and management architecture providing for balanced queue memory utilization to prevent queue congestion and overflow problems, and to provide for queue control management providing for bidirectional simultaneous data flow permitting both input and output queuing to be performed concurrently.

SUMMARY OF THE INVENTION

In accordance with one aspect of the invention, an input processor recognizes and accepts a wide variety of protocols and formats including fast ATM and fast Ethernet to produce prioritized uniform cells for internal use within the dual balanced queues, for effective queue management. A queue management subsystem stores the uniform cells in a memory subsystem, and maintains a dual free linked list for both memory banks, and two individual in use link lists, one for each memory bank.

A queue usage subsystem determines at defined points in time whether and which of the first and second queue memory banks are in use, and a queue selection subsystem responsive to the usage subsystem determines which queue memory bank is in use and which is available, and selects a memory bank not in use, and a second queue select subsystem responsive to the usage subsystem determines when neither first nor second queue memory bank is in use and determines selection of one of the first and second queue memory banks, preferably based on which is less full in capacity.

These and other aspects and attributes of the present invention will be discussed with reference to the following drawings and accompanying specification.

DETAILED DESCRIPTION OF THE PREFERRED EMBODIMENT

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

In the preferred embodiment, a dual bank balanced queue system is provided. In the preferred embodiment, the queue memory banks described hereinbelow are physically separated. However, any memory system which can implement the memory management functions as taught herein (single or multiple banks) can be used as one of ordinary skill can readily appreciate in accordance with the following disclosure.

Figure 1A:
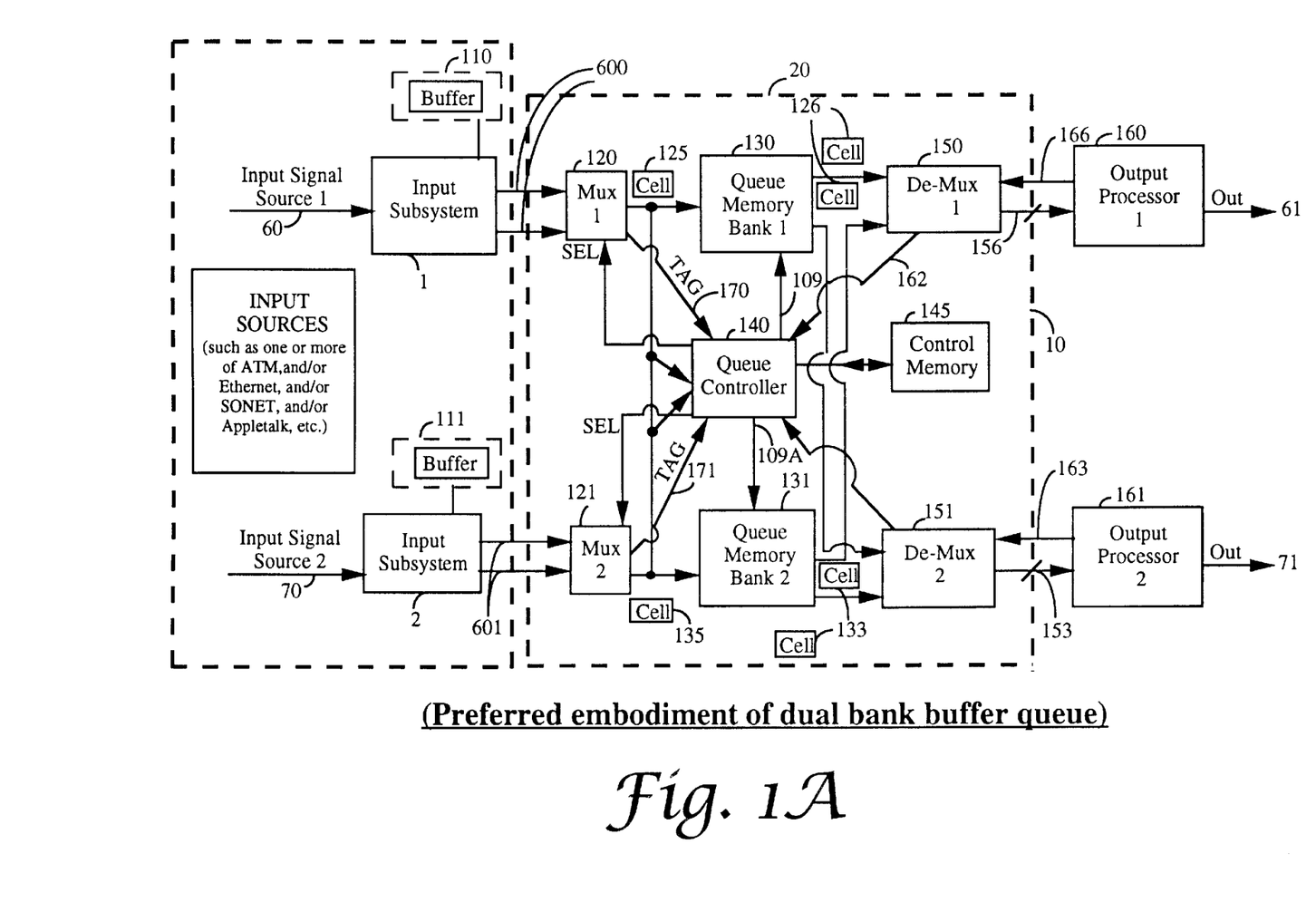
FIG. 1A shows a dual memory bank buffer embodiment of the hybrid queue switch of the present invention.

Referring now to FIG. 1A, the basic elements which comprise the dual bank queue system (10) are shown. Input subsystems (1, 2) accept corresponding incoming data or cells source (60, 70) for coupling to the queue controller (140). The queue controller (140) is coupled to input subsystems (1, 2), via input multiplexers (120, 121), and is coupled to output demultiplexers (150, 151) and therefrom to output processors (160, 161) to provide respective output (60, 61). The queue controller (140) is also coupled to the queue memory (banks 1 and 2) (130, 131). The queue controller processes, stores, and transmits data between input subsystems and output subsystems using the queue memory. The queue controller establishes, maintains, and provides management of the balanced operation (providing both optimal free space usage and concurrent simultaneous input and output processing) dual bank queue operation.

Incoming packet (e.g., Ethernet) data frames of varying length (e.g., from 108 bits to 1582 bits) or ATM cells having a fixed cell length (e.g., of 53 bytes) enter the input subsystems (1, 2), respectively. In a preferred embodiment, there are eight input subsystems, each controlling four channels, to provide for thirty-two channel capacity. For example, each input subsystem (2 and 1, respectively) can support up to four ATM interfaces at 155 Mbps or four fast Ethernet interfaces at 100 Mbps. In an alternate embodiment, the four ATM interfaces may be replaced by one 622 Mbps ATM interface or by a multiple of ATM interfaces at lower speeds.

In the illustrated example as shown in FIG. 1A, input signal source (1) is Ethernet data, and input signal source (2) is ATM data. Alternatively, the input subsystems (1, 2) can be uniprotocol, that is ATM or Ethernet.

The input subsystems (1, 2) establish a connection and terminate the physical network layer for the data communication. The media access control (MAC) layer of the incoming data is part of the received header which establishes a connection. Processing the MAC data layer of ATM and Ethernet is very similar. MAC layer processing is modeled on well known industry standards. (See, for example, IEEE 802.3 [CSMA/CD], IEEE 802.4 [token bus], IEEE 802.5 [token ring], IEEE 802.6 [Metropolitan Are Network]).

Figure 1B:
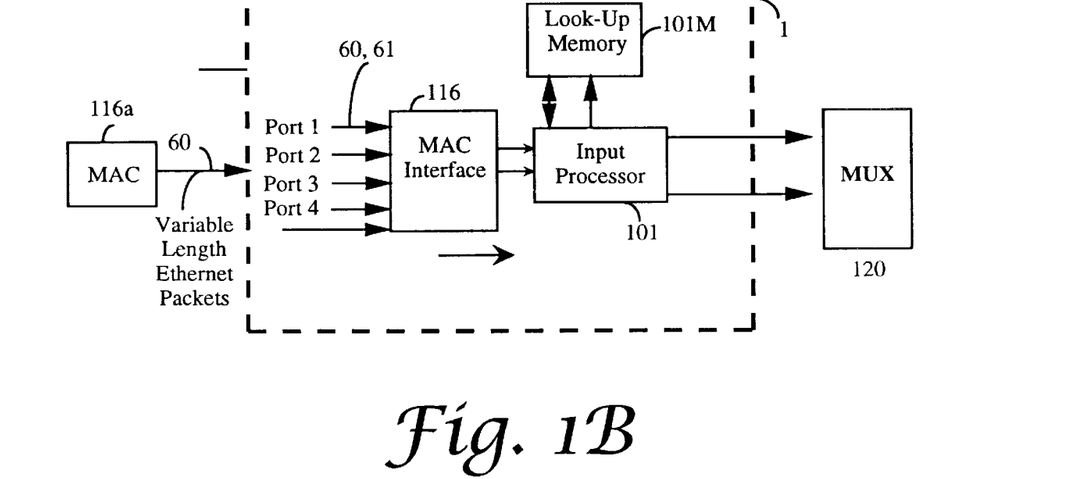
FIG. 1B is a block diagram of an input subsystem directed to received Ethernet data.

Referring to FIG. 1B, received Ethernet packets (60) (normally coming from a conventional Media Access Control (MAC) device (116a), in this example having input ports 1–4) are buffered in a MAC interface (116). As soon as a minimum packet length is received, a lookup function is implemented by the input processor (101) with lookup memory (100m) to gather routing information. After the lookup and routing appendage is complete, a segmentation function is executed by the input processor (101). The segmentation function splits the variable length Ethernet packets (60) into internal cells processable as DTM cells. Housekeeping and encapsulation (such as ensuring packet size and producing parity) is then performed. After this conversion and preparation, the internal cells are then ready to be sent to multiplexers (120, 121) over input buses (600, 601) under the control of the queue controller (140).

Figure 1C:
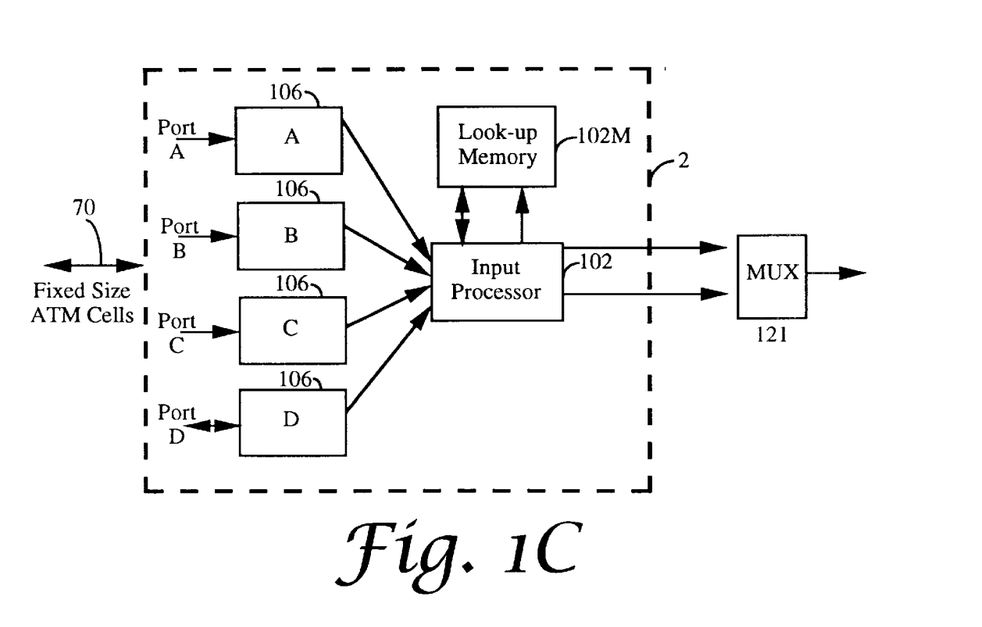
FIG. 1C is a block diagram of an input subsystem directed to received ATM data.

As shown in FIG. 1C, ATM cell data source (70) (having header nd payload portions) is received at the input port A–D (106) of input subsystem (2). By appending a header with the value from a lookup memory (102m) based on the VP/VC (Virtual Path/Virtual Channel) number in the header portion, a lookup function is executed by the queue controller (140). The result of the lookup is then appended to the internal cell by the input processor (102) (FIG. 1C). The queue controller (140) supplies queue management information which is also appended to the cell header by the input processor (102). The appended cell is then buffered in buffer memory (111). the appended cell is then ready to be sent to the multiplexer (121) to the queue controller (140) which provides for the queue memory selection, management, and control of storage.

In the preferred embodiment, the queue controller (14) supplies data routing information which consists of Queue number, Control number, Multicast mask, and Port (priority) number. In the preferred embodiment, the Queue number is a 14 bit tag indicating which queue memory (130, 131) the packet will be stored in. The Control number is a 2-bit tag that indicate start of packet, end of packet, normal cell in a packet, and abort (flush the queue). The Multicast Mask is a 46 bit attachment to a packet for indicating that the packet can be transmitted or routed anywhere. The queue controller (140) uses a two stage multicast mask, the second stage utilizing geographically distributed bits for geographically designating that a packet of interest is geographically limited as to transmission. The first stage multicast mask is used to select an output processor (160, 161).

Figure 2:
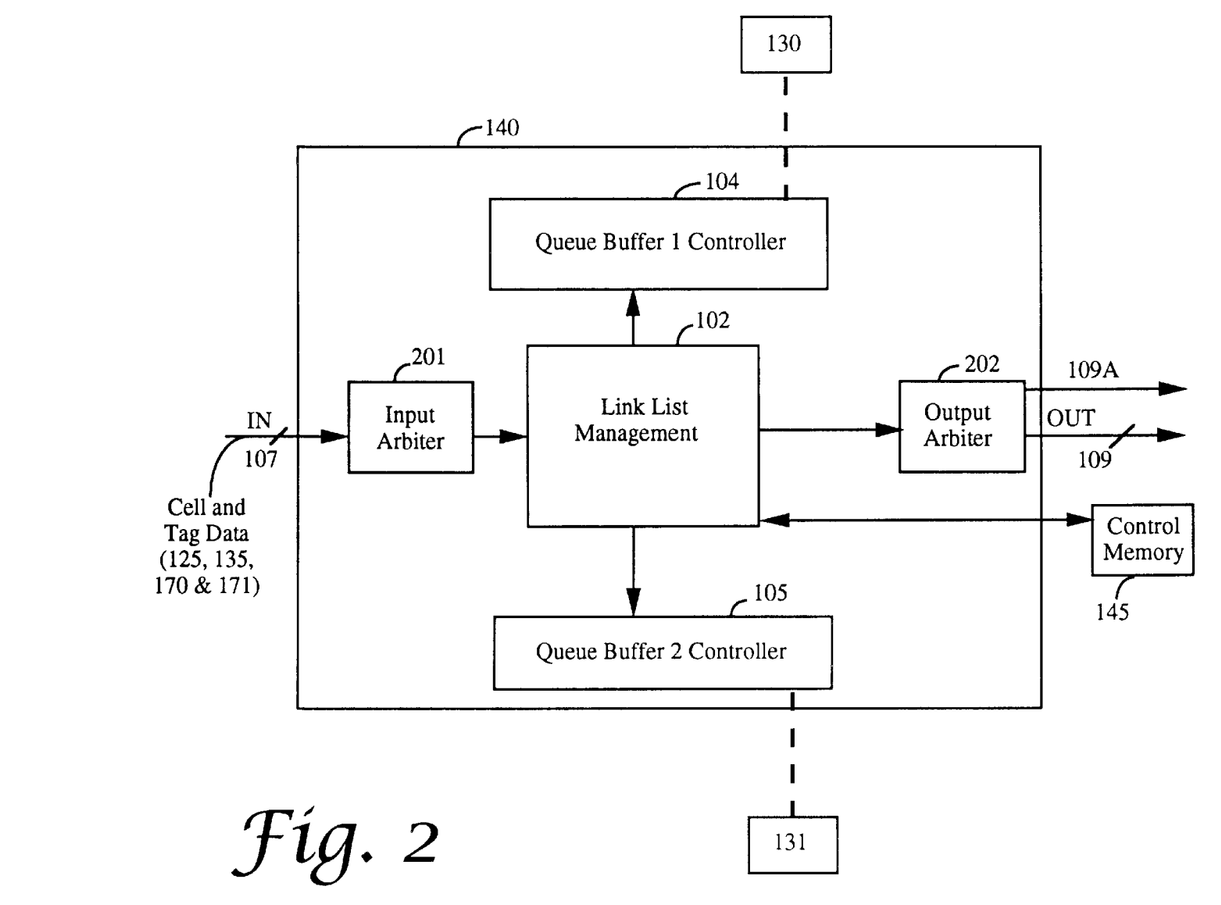
FIG. 2 is a block diagram of a queue controller with link list management.

Referring to FIGS. 1A and 2, port or priority is a number used by the queue controller (140) in its control memory (145) to associate an input processor subsystem (1, 2), and indicate to which output port (61, 71) and what priority the queue memory (130, 131) is assigned. Each queue memory (130, 131) is assigned a set of linkage and mapping and at a processing components by the queue controller (140). Examples of these components include a queue write pointer (19 bits), a queue read pointer (19 bits), a cell counter, a differential counter, and a maximum queue length.

Each input subsystem (1, 2) feeds a corresponding data multiplexer (120, 121), respectively. In the preferred embodiment, each multiplexer (120, 121) selectively receives incoming internal cells from associated input processors (101, 102) and sends those cells to the queue controller (140) which provides for storage of these cells to a specified location in one of the queue memory banks (130, 131) via the input bus (600, 601). In a preferred embodiment, the associated input bus (600, 601) between the multiplexers (120, 121) and input processors (101, 102) is a 16-bit bus running at 50 Mhz. Thus, the present invention provides the simultaneous reading and writing from different queue banks (130, 131) in real time, thus permitting double channel bandwidth including continuous bidirectional queue input and output, simultaneously.

Figure 4:
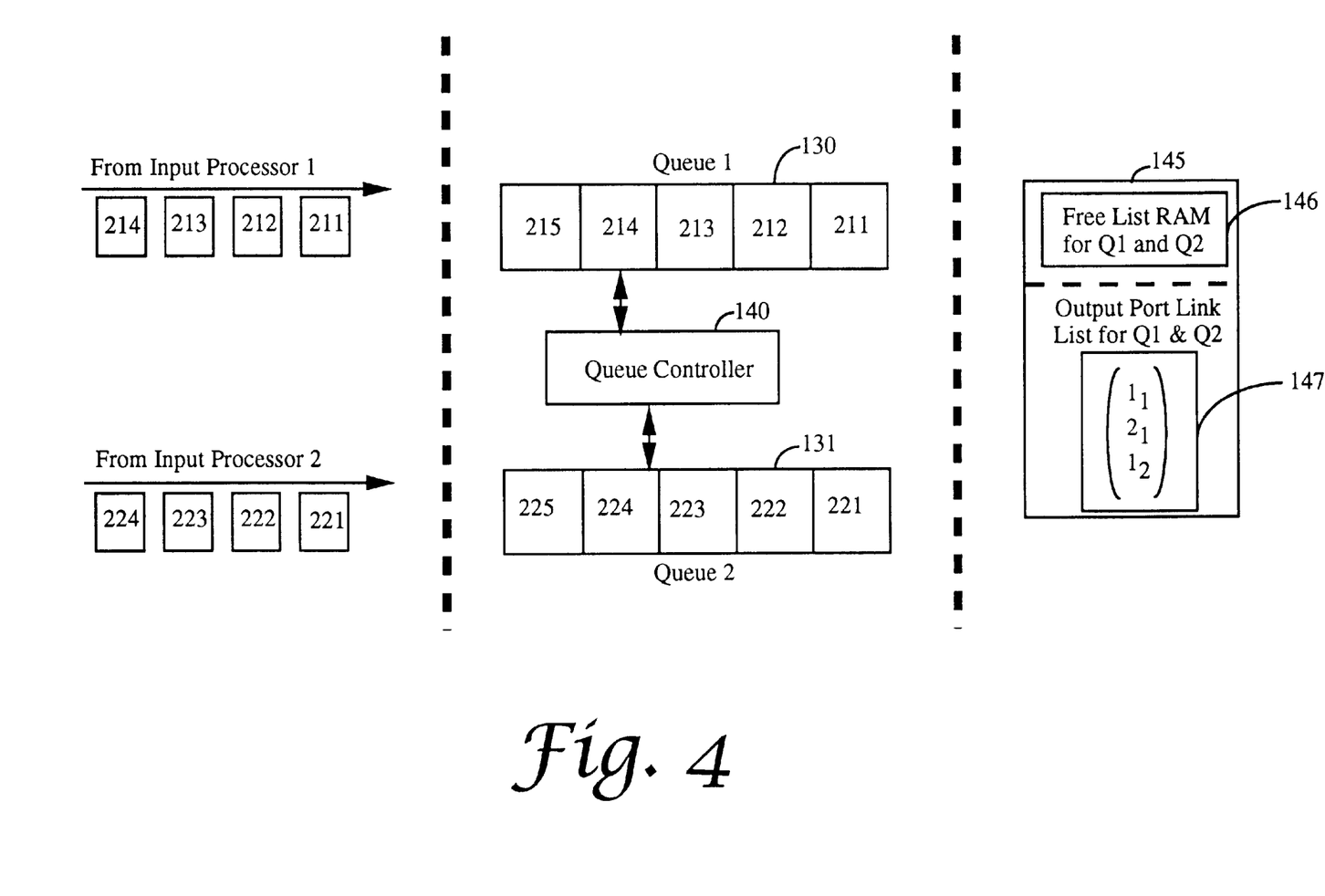
FIG. 4 is a block diagram of the queue controller with link lists for each queue memory.

In the preferred embodiment, the queue controller (140) is constructed on an ASIC and performs numerous additional functions as follows. The queue controller (140) organizes each of the queue memory banks (130, 131) into a number of logical queues (211–215, and 221–225 (FIG. 4)). In a preferred embodiment, the maximum number of queues supported by the system is 16,348. Each internal cell as output by the input processors (101, 102) is assigned such a queue number by the queue controller (140). This queue number is appended to the respective cells by the input processor (101, 102) as stated above. The queue number is placed in the routing tag field within each cell. In one embodiment, the memory consists of Synchronous Dynamic Random Access Memory (SDRAM) which SDRAM requires lower power consumption than non-synchronous DRAM.

In an alternate preferred embodiment, only a single physical memory bank is used, with a single input bus, but structured with two logical queue memory banks therein.

After data enters the buffer (FIG. 1A 110, 111) of the input processors (101, 102), the queue controller (140) arbitrates between the input processors to determine processing priorities, that is determined by the input processor with the highest priority. Priorities are set according to FIFO principles, organized by a link list, described below. The ;multiplexers (120, 121) sends prepared cells to the queue memory banks (130, 131) responsive to the queue controller (140).

Figure 3A:
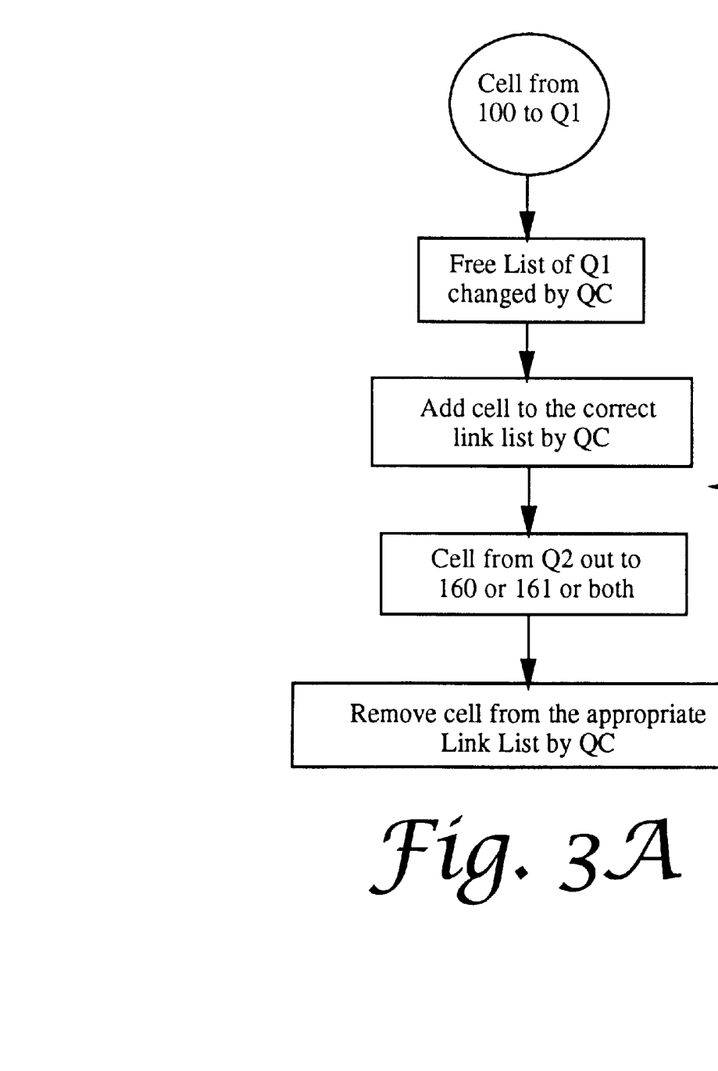
FIGS. 3A and 3B are flow diagrams of the dual bank embodiment hybrid queue switch of the invention.
Figure 3B:
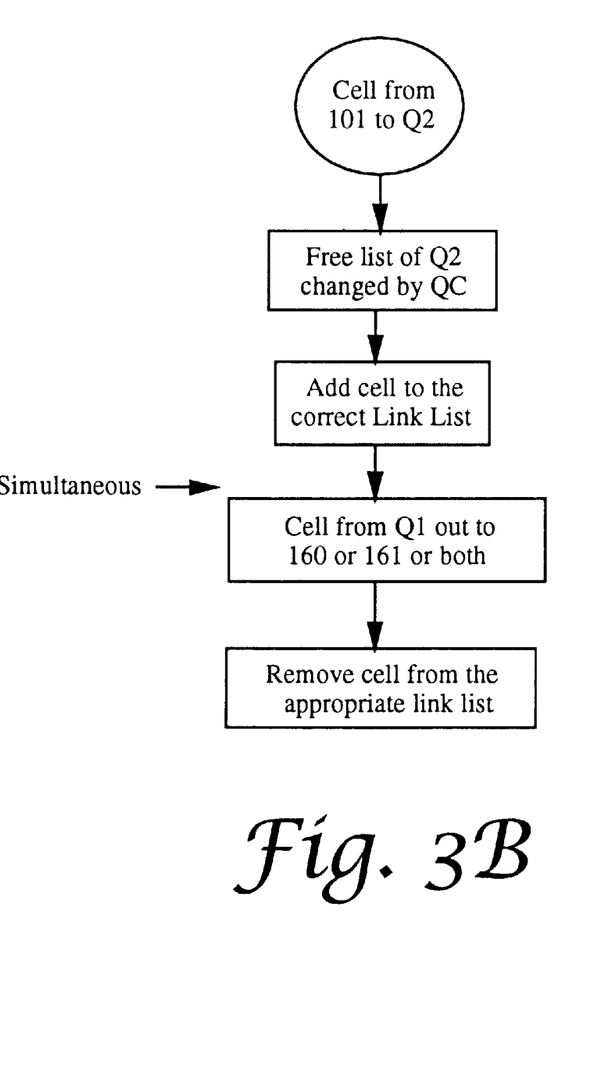
Figure 5:
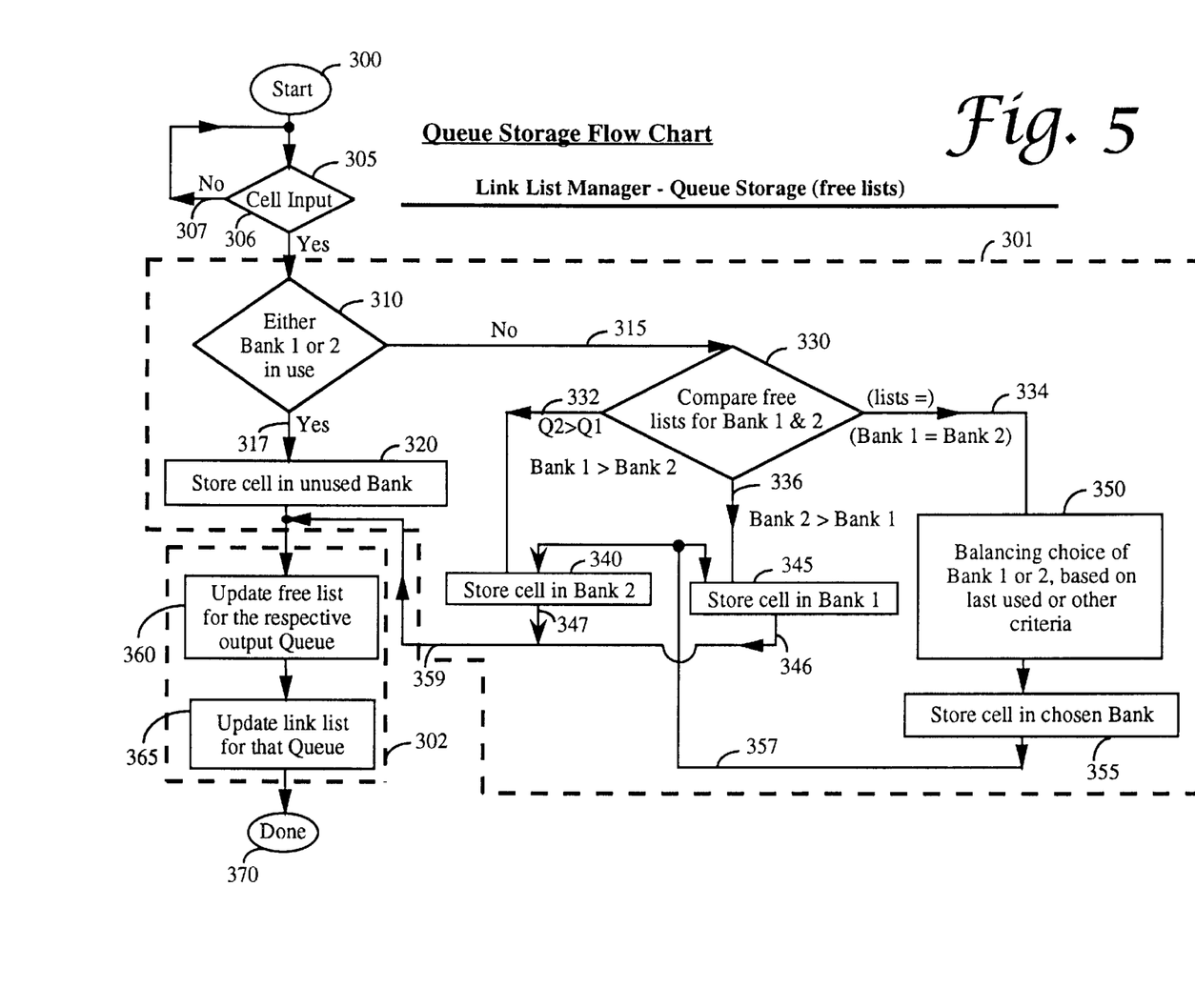
FIG. 5 is a queue storage state flow chart.

Turning to the flow diagram of FIG. 5, the queue controller also defines the memory location where the prepared cell will be sent based on current queue memory bank (130, 131) availability, and if both banks are available, the bank chosen is that having the most available free memory space. If a memory bank (130 or 131) is currently in use, the queue controller (140) sends the prepared cell to the idle bank not in use, queue memory bank (130, 131) for the write operation. This dual bank queue memory system of the present invention allows for concurrent reading and writing to memory. This novel switch fabric thus provides for simultaneously writing to one queue bank (e.g., 130) while the other queue bank (e.g., 131) is being read from (FIG. 3). and can also provide for two concurrent simultaneous read or writes.

Continuing to refer to FIG. 5, a dual free-cells list mechanism in the queue controller (140) ensures load balancing between the two queue banks (130, 131). If neither queue memory bank (130, 131) is in use, the queue controller (140) loads the queue memory bank that has the most unused memory. By so doing, the queue controller (140) balances the amount of available memory in each queue bank. Data in the memory banks (130, 131) is maintained in the form of queues on a FIFO basis, organized by a link list (102) maintained by the queue controller (140) (FIG. 2) with the control memory (145).

A cell in queue memory consists essentially of two parts, data and control (header). The control portion is established by the queue controller and contains the link list pointers (or address) of the data (FIG. 7).

Figure 7:
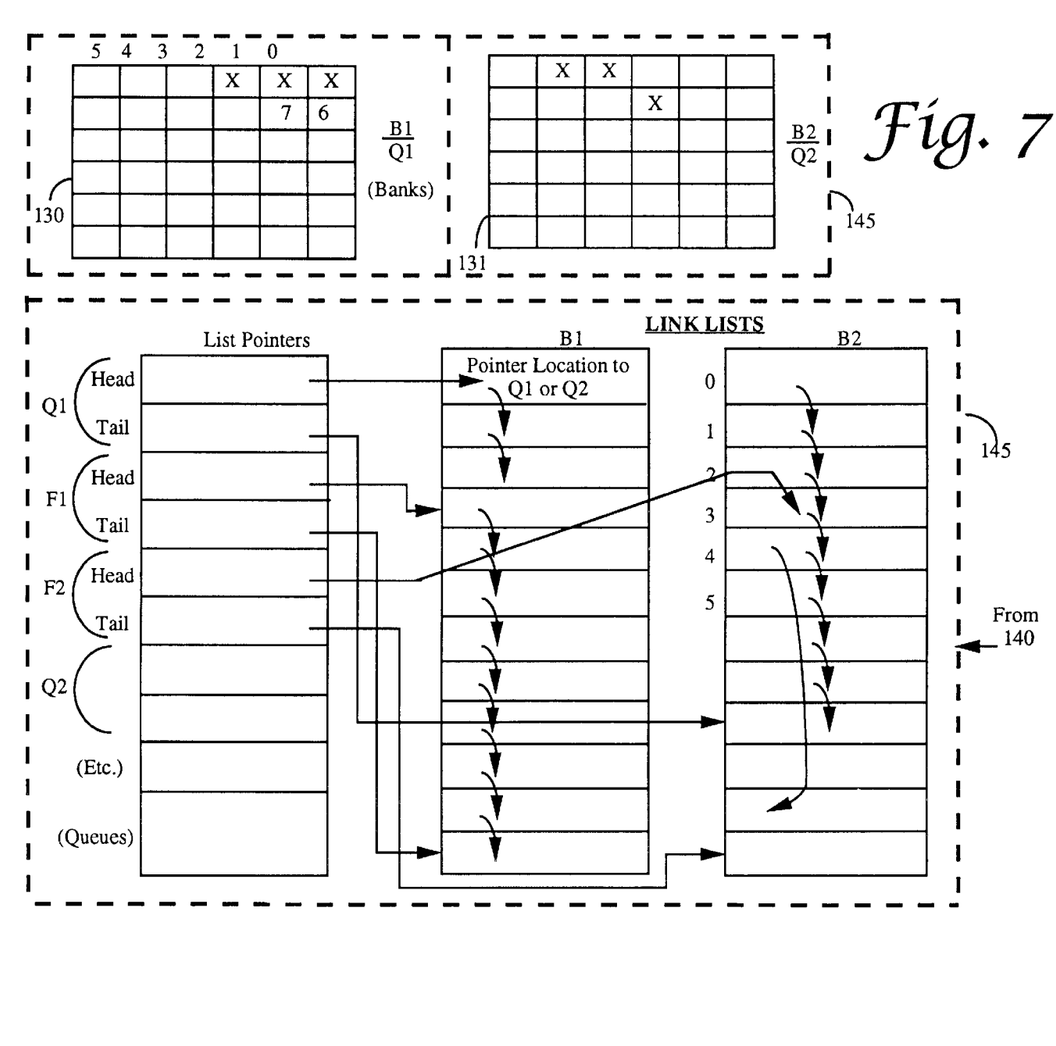
FIG. 7 is a block diagram of the link list pointers and the associated data storage location showing how input data is stored in the dual memory queue banks of the illustrated embodiment of the invention.

As shown in FIG. 7, detailing control memory (145), the header portion (Q1, F1), etc. of a data cell, may be stored in one queue memory location and the tail portion may be stored in another queue memory. The link list is used to enable this operation, and keeps track of the mapping relationships.

Subsequent to writing to a queue memory location, the queue controller (14) manages the link list subsystem (102) for the cell buffer (110, 111) and the location therein. Link list memory is provided by control memory (145) and is assigned on a per cell basis, to maintain the queues as described. The control memory (145) is addressed under the control of the input arbitrator (201) and the output arbitrator (202) to prepare each read/write cycle. Each of cell queue buffer controllers (104, 105) is assigned to a respective one of the queue memory banks (130, 131) to maintain a free link list for chaining all of the unoccupied queue memory in each bank and also creates a link listing for every queue which is so defined (FIG. 7). This dual free link list subsystem thereby provides for the simultaneous read and/or write from the balanced, shared queue memory upon demand.

The queue controller (140) further performs cell measurement for monitoring and policing the actual status of data transmission, so as to be aware of actual queue memory space available.

Figure 6:
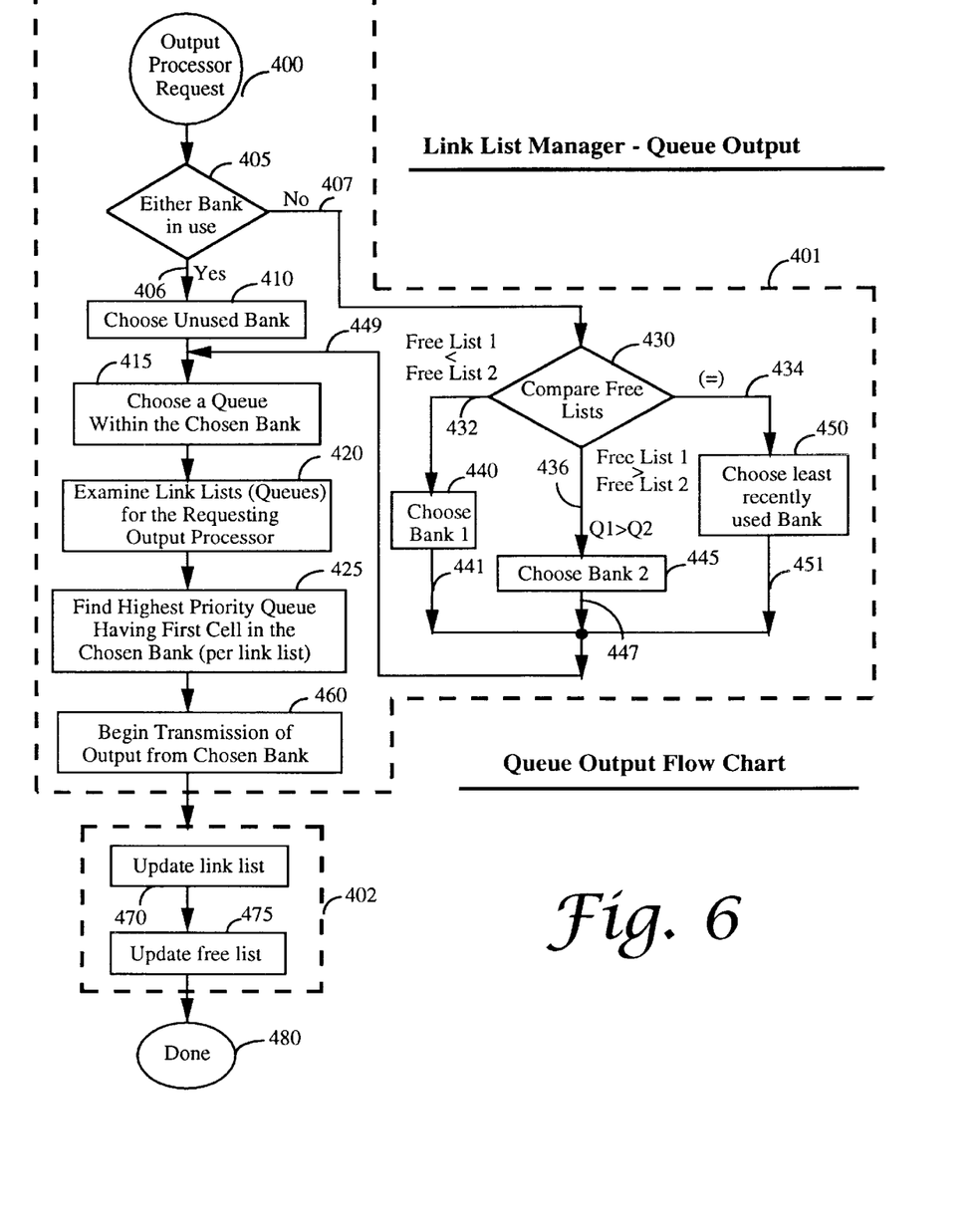
FIG. 6 is a queue output state flow chart.

As shown in the flow diagram of FIG. 6, to ready data for final transmission out, the queue controller's output arbitration subsystem (202) (under the control of the queue controller (140)) functions as a queue serve, arbitrating data output functions. This is accomplished in the illustrated embodiment, using a round robin routine considering weighted priorities subsequent to choosing an available queue memory bank (130, 131). The same round-robin weighted process is used to provide for storing incoming data, utilizing the link list (420) with the highest priority (425). The output arbitration subsystem (202) coordinates the output demultiplexers (150, 151) to buffer and resegment the data from a chosen queue memory (130, 131) into an acceptable concatenated form for output, and sends it to the proper, respective output processors (160, 161) via a respective output bus )163, 166) for transmission (460).

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A digital switching system for coupling data between a plurality of external signal sources each having a respective signal protocol from at least two unique signal protocols, said system comprising:

a plurality of input processor subsystems coupled for receiving and processing said data from the signal sources to convert the data from the respective one of the unique signal protocols into cells for output;

a data multiplexer coupled to the output of each said input subsystems for multiplexing a selected one of the cells from said input subsystem to provide a multiplexed data output;

an addressable queue memory comprised of multiple simultaneously accessible memories for storing and retrieving the multiplexed data in the addressable memory;

a queue controller coupled to said data multiplexer output and to the addressable memory for creating and managing a plurality of memory queues in the addressable memory for selectively storing and retrieving said multiplexed data in the addressable memory;

a plurality of output processors, each coupled to a respective one of the external signal sources; and a data demultiplexer coupled to said plurality of output processors and to said addressable queue memory for demultiplexing the retrieved multiplexed data and for selectively coupling the retrieved multiplexed data to a respective one of the output processors responsive to said queue controller; said plurality of output processors providing for selectively outputting the demultiplexed data in the unique signal protocol compatible with the respective one of the external signal sources associated with the respective one of the output processors, responsive to the queue controller.

2. The system of claim 1, wherein said queue controller comprises a control memory wherein the queue controller maintains control data in the control memory used for managing the memory queues.

3. The system of claim 2, wherein said data from said signal sources comprises a data header and payload, wherein said queue controller is responsive to said header data responsive to the queue controller for assigning a location in one of the queue banks for storage of the data cell associated with said header data.

4. The system as in claim 3, wherein said queue controller is responsive to said header data to determine a destination ID, for a specific one of the signal sources associated with the payload, and said queue controller further comprising means for storing in the control memory a mapping of the linking between data cells and the specific respective one of the external signal sources.

5. The system of claim 3, wherein at least one of said data signal sources is comprised of Ethernet data.

6. The system of claim 1, wherein said queue memory is comprised of at least two autonomous memories for storing the multiplexed data.

7. A digital switching system for coupling data between a plurality of external signal sources each having a respective signal protocol from at least two unique signal protocols, said system comprising:

means for receiving and processing said data from the signal sources to convert the data from the respective one of the unique signal protocols into cells;

an addressable queue memory comprised of at least two simultaneously accessible queue memory banks for storing and retrieving the cells in the addressable memory;

a queue controller for creating and managing a plurality of logical memory queues in the addressable queue memory for selectively storing and retrieving said cells in the addressable memory; and means for routing the retrieved cells and for selectively coupling the retrieved cells to a respective one of the plurality of external means responsive to said queue controller, and for outputting the retrieved cells in the unique signal protocol compatible with the respective one of the external signal sources associated with the respective one of the output processors, responsive to the queue controller.

8. The system of claim 7, wherein said queue controller comprises a control memory wherein the queue controller maintains control data in the control memory used for structuring and managing access to the memory queues.

9. The system of claim 8, wherein said data from said external signal sources comprises a data header and payload, wherein said queue controller is responsive to said header data for assigning a location in one of the queue banks for storage of the data cell associated with said header data.

10. The system as in claim 9, wherein said queue controller is responsive to said header data to determine a destination ID, for a specific one of the signal sources associated with the payload, said queue controller further comprising means for storing in the control memory a mapping of the linking between data cells and the specific respective one of the external signal sources.

11. The system as in claim 7, wherein the queue controller arbitrates between the input processors to determine processing priorities, and grants priority to the input processor in accordance with FIFO principles.

12. The system as in claim 11, wherein the priorities are organized by the linked lists.

13. The system as in claim 7, wherein the queue controller organizes each of the queue memory banks into a plurality of logical queues.

14. The system as in claim 13, wherein each of the retrieved cells is assigned to a respective one of the logical queues and is assigned a respective queue number by the queue controller.

15. The system as in claim 14, wherein the queue number is appended to the respective cells by the respective input processor.

16. The system as in claim 15, wherein the queue number is placed in the header for each of the cells.

17. The system as in claim 16, wherein the queue number is placed within a routing tag field in the header.

18. A digital switching system for coupling data between a plurality of external signal sources each having a respective signal protocol, said system comprising:

means for receiving and processing said data from the signal sources to convert the data into cells;

an addressable queue memory comprised of at least two simultaneously accessible queue memory banks for storing and retrieving the cells in the addressable memory;

a queue controller for creating and managing a plurality of logical memory queues in the addressable queue memory for selectively storing and retrieving said cells in the addressable memory; and means for routing the retrieved cells and for selectively coupling the retrieved cells to a respective one of the plurality of external means responsive to said queue controller, and for outputting the retrieved cells in a signal protocol compatible with the respective one of the external signal sources, responsive to the queue controller;

wherein said queue memory system is further comprised of:

a first queue memory bank having a predefined amount of available storage;

a second queue memory bank having a predefined amount of available storage;

said queue controller controlling said first and second queue memory banks, said queue controller further comprising a link list management subsystem, said link list management subsystem comprised of:

queue usage means for determining at defined points in time whether and which of the first queue memory bank and the second queue memory bank are in use;

first queue select means, responsive to said usage means determining that the other queue memory bank is in use, for selectively storing the internal cells for the input data in the queue memory bank that is not use; and second queue select means, responsive to said usage means determining that neither the first queue memory bank or the second queue memory bank is in use, for determining selection of storage for use of said first and said second queue memory banks.

19. The system as in claim 18, wherein said link list management subsystem is further comprised of:

free list means for maintaining an integrated record of storage capacity available and used for each of said first and second queue memory banks; and first and second link list means, each for maintaining a queue record for the respective one of said first and second queue memory banks, for providing a separate queue for each respective destination.

20. The system as in claim 19, wherein said link list management subsystem is further comprised of:

means for selecting one of said first and second queue memory banks for storage of the data cells for the input data responsive to said free list means record of storage capacity; and means for selecting one of said first and second queue memory banks for output therefrom of selected stored ones of the data cells to respective ones one of said predefined destinations, responsive to said first and second link list means.

21. A digital switching system for coupling data between a plurality of external signal sources each having a respective signal protocol, said system comprising:

means for receiving and processing said data from the signal sources to convert the data into cells;

an addressable queue memory comprised of at least two simultaneously accessible queue memory banks for storing and retrieving the cells in the addressable memory;

a queue controller for creating and managing a plurality of logical memory queues in the addressable queue memory for selectively storing and retrieving said cells in the addressable memory; and means for routing the retrieved cells and for selectively coupling the retrieved cells to a respective one of the plurality of external means responsive to said queue controller, and for outputting the retrieved cells in a signal protocol compatible with the respective one of the external signal sources, responsive to the queue controller;

wherein each of the queue memory banks is assigned a set of data processing components by the queue controller comprising a queue write pointer, a queue read pointer, a cell counter, a differential counter, and a maximum queue length.

* * * * *